United States Patent [19]

Thomas

[11] 4,315,818
[45] Feb. 16, 1982

[54] ANTI-POLLUTION EQUIPMENT

[75] Inventor: John L. Thomas, Ottershaw, England

[73] Assignee: The British Petroleum Company Limited, London, England

[21] Appl. No.: 152,086

[22] Filed: May 21, 1980

[30] Foreign Application Priority Data

May 29, 1979 [GB] United Kingdom ............... 18697/79

[51] Int. Cl.³ ............................................. E02B 15/04
[52] U.S. Cl. .................................. 210/242.3; 210/924
[58] Field of Search ......................... 210/923, 242, 924

[56] References Cited

U.S. PATENT DOCUMENTS

| | | | |
|---|---|---|---|
| 1,860,819 | 5/1932 | Schembeyer | 210/924 |
| 3,685,653 | 8/1972 | Steven | 210/242.3 |
| 3,685,653 | 8/1972 | Van Starem | 210/242.3 |
| 3,700,107 | 10/1972 | Harem | 210/242.3 |
| 3,702,297 | 11/1972 | Matsim, Jr. | 210/242.4 |
| 3,968,041 | 7/1976 | DeVoss | 210/242.3 |

FOREIGN PATENT DOCUMENTS

| | | | |
|---|---|---|---|
| 2114382 | 10/1971 | France | 210/242 |
| 79/01135 | 12/1979 | Int'l Pat. Institute | 210/242 |
| 52/33168 | 3/1977 | Japan | 210/242 |

Primary Examiner—Theodore A. Granger
Attorney, Agent, or Firm—Morgan, Finnegan, Pine, Foley & Lee

[57] ABSTRACT

A device for picking up oil floating on the surface of water, particularly heavy fuel oil and weathered crude oil, which device comprises;
(a) a first rotatable drum (2) having corrugations (3) extending across its surface;
(b) a second, smaller rotatable drum (11) having corrugations (12) extending across its surface adapted to mesh with the corrugations (3) of the first drum (2);
(c) means for driving one or other of the drums;
(d) a collector for recovered oil (14) mounted below the area where the gear teeth mesh, and
(e) at least one float so that in use the device floats with the first larger drum (2) partially immersed in water and the second smaller drum (11) and collector (14) clear of the water.

5 Claims, 1 Drawing Figure

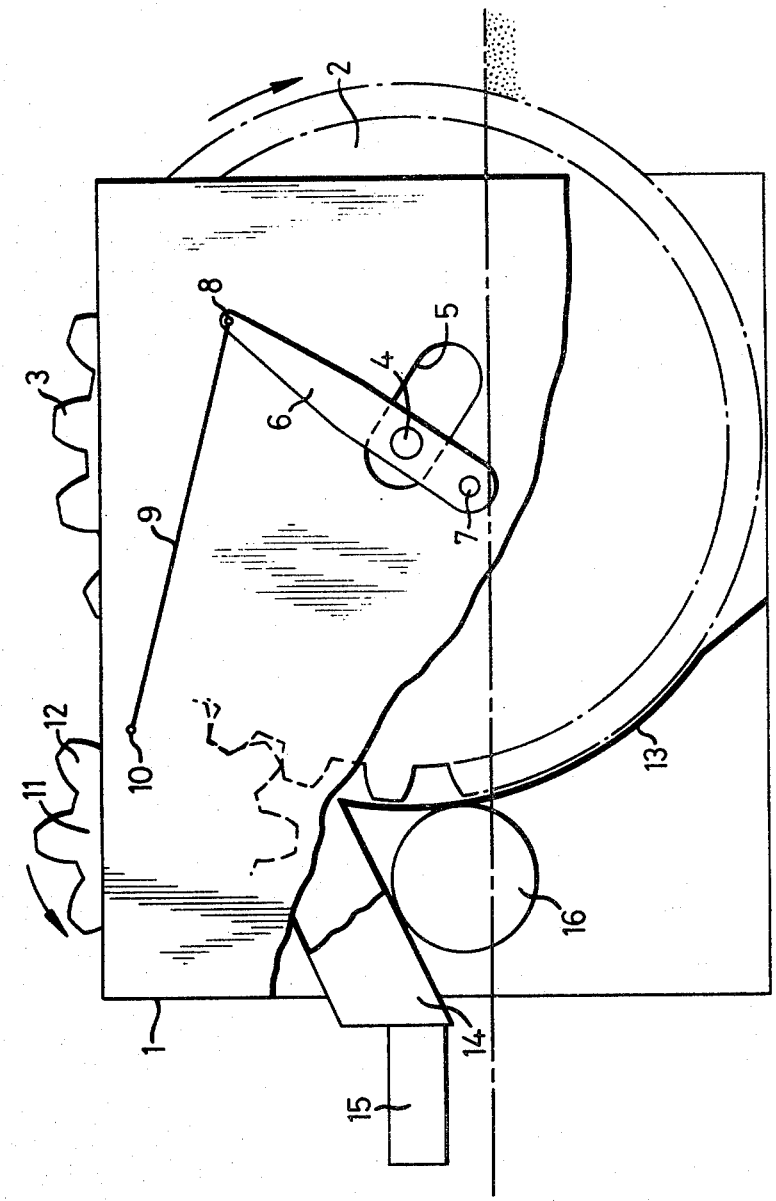

ANTI-POLLUTION EQUIPMENT

This invention relates to a device for picking up oil floating on the surface of water, particularly heavy fuel oil and weathered crude oil known as mousse.

When crude petroleum or refined petroleum products are transported there is a risk of accidental spillage or unauthorised discharge taking place. If this happens at sea or an inland waterways the water is likely to be polluted by the oil. In recent years several instances of pollution caused by collisions or groundings of tankers have occurred. Another potential risk of water pollution lies in the offshore production of oil. Although every precaution is taken to prevent disasters such as blow outs and to minimise their effect by incorporating oil shut off devices within production units, the possibility of an accident cannot be disregarded.

Removing oil from water in these circumstances is a difficult operation and many proposals have been made for the containment and recovery of spilt oil.

British patent specification 1,188,156 describes a barrier for containing oil spilt on water. The barrier comprises one or more air chambers and one or more water chambers, all the walls of the chambers being formed of flexible material. The chambers are so positioned that when suitably inflated with air and water the barrier will float with part above and part below the water surface so as to impede the passage of floating oil. The barrier can be made to take up a U or J configuration and form a corral within which the oil is concentrated. Skimming devices may then be employed to recover the collected oil.

Skimming devices of various designs have been proposed for recovering oil from the surface of water and many of these devices employ discs or cylinders mounted on rotatable shafts.

The discs of a disc skimmer are flat plates separated from each other by spacers. Such devices are usually supported on floats so that when they are placed in oil contaminated water they float with the discs partly immersed in the water. The shafts are rotated to enable oil adhering to the discs to be carried away from the water surface, scraped off by scraper blades and removed. The skimmers may be linear, have parallel banks, or be circular, triangular, rectangular or polygonal.

Oil skimmers which employ cylinders or rollers are also usually supported on floats so that when they are placed in oil contaminated water, they float with at least one roller partly immersed in the water. This partly immersed roller is rotated and oil adhering to the roller is carried away from the water surface and removed, for example, by a second "wringer" roller.

Such skimmers have a high pick-up rate for relatively light oils such as petroleum fractions up to and including gas oil and freshly spilled crude petroleum but they cannot pick up heavy materials such as heavy fuel oil and "mousse".

We have now devised an oil skimmer which is capable of dealing with such products.

Thus according to the present invention there is provided an oil pick-up device for removing oil floating on the surface of water which device comprises (a) a first rotatable drum having corrugations in the form of gear teeth extending across its surface, (b) a second smaller rotatable drum having corrugations in the form of gear teeth extending across its surface adapted to mesh with the teeth of the first drum, (c) means for driving one or other of the drums, (d) a collector for recovered oil mounted below the area where the gear teeth mesh, and (e) at least one float so that in use the device floats with the first larger drum partially immersed in water and the second smaller drum and collector clear of the water and with the plane joining the axes of rotation of the drums at an angle between the horizontal and the vertical.

The first drum itself is preferably hollow and self buoyant, thereby acting as its own float.

The second drum is preferably adapted to be driven by a motor which may be hydraulic, pneumatic, electric or an internal combustion engine.

The second drum is smaller than the first drum and the ratio of their diameters is preferably in the range from 1:1.75 to 1:2.25.

Preferably the plane joining the axes of rotation of the drums is at an angle with the horizontal of between 25° and 35°.

The corrugations on each drum are preferably gear teeth conforming to BS 436. They may be made from extruded aluminium, plastics or wood and secured mechanically to the drums. In practice, a quick and inexpensive method of providing suitable gear teeth is to wrap corrugated aluminium sheet around the drums.

Typical dimensions for the gear teeth are:

| | |
|---|---|
| Height | 40 mm |
| Width at base | 70 mm |
| at top | 20 mm |
| Distance between teeth at base | 20 mm |

The drums can be made of any rigid material inert to water and oil, e.g. stainless steel, surface protected steel, aluminium and rigid polyvinyl chloride.

The device may be free floating in which case a float may be provided beneath the collector to maintain the device in the correct configuration. If the load on the device is variable it may be advantageous for the float beneath the collector to be of variable buoyancy so that the optimum configuration may be maintained. This could be achieved, for example, by allowing water into or expelling it from the float as necessary. Alternatively the device may be pivoted from a support vessel in which case the pivot arrangement should position it correctly.

The first drum is preferably mounted on a shaft between arms which themselves are free to pivot to a limited extent but are biased to urge the first drum against the second. Biasing may be provided by an elastic shock cord or spring loading.

In use, the device will be placed on polluted water and the float(s) will ensure that the first drum is partially immersed in the water. When the driving force is applied to the drums, the first drum rotates in the water and oily water is caused to flow towards the drum. Some adheres to the surface and lumps are trapped between the surface corrugations. As the first drum rotates still further it meshes with the second drum and the oil and oily lumps are squeezed out and drop into the collector positioned beneath from which they may be removed by pumping.

If a lump of hard, incompressible debris is picked up, the preferred pivoting arrangement for the first drum permits the drums to disengage temporarily to release the debris and subsequently remesh.

The invention is illustrated with reference to the accompanying drawing which is a schematic drawing.

The skimmer comprises a frame 1 in which is mounted a hollow, selfbuoyant drum 2 having corrugations in the form of gear teeth 3 on its surface. The drum 2 is mounted on a shaft 4 which is free to move within an elongated slot 5. The shaft 4 is mounted on arms 6 which pivot at one end 7 and have an eyelet 8 at the other end for attachment of a shock cord 9 anchored to an eyelet 10 in the frame 1.

A second smaller drum 11 having similar corrugated teeth 12 on its surface meshing with the teeth 3 is also mounted on the frame 1. Drum 11 is driven by a motor (not shown).

A guide plate 13 is provided to retain trapped oil within the spaces between the teeth 3. This merges into a weir collector 14 fitted below the area where the teeth 3 and 12 mesh to collect expelled oil which is removed by line 15.

A float 16 is fitted below the collector 14 to maintain the skimmer in the correct configuration.

The use of the device for recovering heavy fuel oil is illustrated by the following example.

EXAMPLE

An oil pick-up device according to the present invention was used to recover a heavy fuel oil from the surface of a body of water.

The heavy fuel oil had the following properties:

|  |  | ASTM-IP Joint Test Method |
|---|---|---|
| Max. Density at 15° C. | 0.995 kg/liter | D 1298/160 |
| Max. Viscosity at 82.2° C. | 70 cSt | D 445/71 |
| Max. Pour Point | 30° C. | D 93/15 |

The device had a first rotatable drum of 62 cm diameter and 100 cm length. The drum had a total of 20 corrugations, each 25 mm high. The smaller drum had a diameter of 32 cm, was of the same length and had a total of 10 corrugations each also 25 mm high.

With the larger drum rotating at a speed of between 10 and 15 revolutions per minute, the device was able to recover the heavy fuel oil at a rate of 10 tonnes per hour, at an oil temperature of 10° C.

I claim:

1. A device for removing oil floating on the surface of water which device comprises a frame, two rotatable drums, one of which is larger than the other, each drum having corrugations in the form of gear teeth extending across the surface of the drum, said corrugations being parallel to each other and to the axis of the drum and being adapted to mesh with the corrugations of the other drum, the device also comprising:
   (a) means for driving one of the drums;
   (b) a collector for recovered oil mounted below the area where the gear teeth of the two drums mesh during rotation thereof; and
   (c) at least one float so that in use the device floats with the larger drum partially immersed in water and with the smaller drum and collector clear of the water and with the plane joining the axis of rotation of the drums at an angle between the horizontal and the vertical.

2. A device according to claim 1 wherein the larger drum is hollow and acts as a float.

3. A device according to claim 1 in which the ratio of the diameter of the smaller drum to the diameter of the larger drum is in the range of 1:1.75 to 1:2.25.

4. A device according to claim 1 in which the plane joining the axes of rotation of the drums is at an angle with the horizontal of between 25° and 35°.

5. A device according to claim 1 in which the larger drum is mounted on a shaft between arms, which arms are mounted on the frame of the device and are biased to urge the larger drum against the smaller drum.

* * * * *